Patented Feb. 11, 1941

2,231,502

UNITED STATES PATENT OFFICE 2,231,502

PROCESS FOR THE PRODUCTION OF HIGH-MOLECULAR NITROGENOUS CONDENSATION PRODUCTS

Hans Krzikalla, Paul Garbsch and Wilhelm Pannwitz, Ludwigshafen-on-the-Rhine, Germany, assignors, by mesne assignments, to General Aniline & Film Corporation, New York, N. Y., a corporation of Delaware No Drawing. Application March 15, 1938, Serial No. 195,972. In Germany December 10, 1935

10 Claims. (Cl. 260—100)

This application is a continuation-in-part of our copending application Ser. No. 113,878, filed on December 2, 1936, which relates to the production of high molecular nitrogenous condensation products from abietinyl derivatives.

We have found that valuable nitrogenous condensation products of high molecular weight can be obtained by causing ether-like condensation products from resin alcohols which contain reactive halogen atoms attached to alkyl radicles to react with amines or nitrogenous heterocyclic bases, or by causing alcohols, carboxylic acids or organic poly-halogen compounds containing reactive halogen atoms in the alkyl radicle to react with amines or nitrogenous heterocyclic bases and then converting the products thus obtained into ether-like products by treatment with resin alcohols.

The resin alcohols suitable for the process according to this invention may be obtained by the reduction of naturally ocurring resin acids or their esters, such as abietic acid, copalic acid and the like, furthermore substances, which contain resin acids in a considerable amount, such as colophony, copal resin and the like, for example by treatment with sodium and alcohol or by hydrogenation in the presence of hydrogenation catalysts. The ordinary resin alcohols may be employed according to this invention but resin alcohols which are hydrogenated in the nucleus, such as di- or tetrahydroabietinol, are especially suitable. The resin alcohols employed in the present process may also be substituted by halogen atoms.

The resin alcohols are caused to react with aliphatic alcohols containing reactive halogen atoms, preferably in the form of their sulphuric acid esters, as for example chlorethyl alcohol, brompropyl alcohols or aliphatic substances capable of yielding alcohols with reactive halogen, such as epichlorhydrin. Thus abietinyl halogen alkyl ethers are obtained which have the general formula:

R—CH₂—O—R₁—Hal wherein R represents the cyclic radicle of abietic acid or its hydrogenation products, R₁ represents an alkylene or hydroxy alkylene radicle and Hal represents a halogen atom. The preparation of the abietinyl halogen alkyl ethers may also be carried out by causing alkylene oxides to act on abietinol and then replacing the terminal hydroxyl group by a chlorine atom, for example by treatment with phosphorus oxychloride. Compounds of this nature may also be obtained by condensing abietinol or di- or tetrahydroabietinol with hydroxyethers containing halogen atoms, as for example beta-chlor-beta¹-hydroxy-diethyl ether; in the latter case a product is obtained having the following formula:

R—CH₂—O—C₂H₄—O—C₂H₄—Cl

Carboxylic acids containing reactive halogen atoms suitable for condensing with the resin alcohols or resin amines in the present process are for example the halogen-containing acetic acids, brompropionic acid, chlorbutyric acid, alpha-brompalmitic acid and the like. Polyhalogen compounds suitable in the present process are for example ethylene bromide, dibrompropane and the like.

The condensation of the resin alcohols with the said compounds containing reactive halogen atoms may be effected in the usual manner, as for example with the addition of substances splitting off water.

The said abietinyl derivatives containing reactive halogen atoms are then caused to react with any desired nitrogenous, basic reacting compounds, as for example aliphatic, cycloaliphatic, aromatic or aliphatic-aromatic amines, or with nitrogenous heterocyclic bases. Suitable amines and heterocyclic bases are for example diethylamine, trimethylamine, ethylenediamine dodecylamine, oleylmethylamine, piperidine, aniline, methylaniline and pyridine. The said amines may contain in the organic radicle substituents, as for example carboxylic, ether, ester or sulphonic groups. Suitable substituted amines are for example sarcosine and taurine.

Valuable products may also be obtained in the reverse manner by causing resin alcohols, to react with halogen alkyl amines, alkylol amines polyamines or chlorides of amino acids in the manner set forth above. For example abietinol, di- or tetrahydroabietinol may be caused to react with halogen alkylamines, such as chlorethylamine, β, β'-dichlordiethylamine or chlorhexylamine; thus for example compounds of the formula

R—CH₂—O—R₁—NH₂ are obtained.

When using tertiary amines, such as trimethylamine or pyridine, for the condensation with the reactive halogen containing abietic esters, quaternary ammonium compounds are formed. If desired the products obtained may be converted into the corresponding salts for example by adding hydrochloric acid, sulphuric acid, acetic acid and the like.

The products obtainable according to this invention, insofar as they are soluble in water, constitute valuable wetting, washing and dispersing agents. They may therefore be used with advantage in the textile, leather, paper and like industries. The water-insoluble products of the said kind are suitable for example as softening agents or as additions to lacquers, rubber masses and the like. The products may be used alone or together with other assistants usual in the textile, leather, paper and like industries, as for example soaps, Turkey red oils, sulphuric esters of aliphatic alcohols of high molecular weight, true sulphonic acids of aliphatic compounds of high molecular weight, as for example sulphopalmitic acid, or condensation products derived from hydroxyalkyl or aminoalkyl sulphonic acids and fatty acids of high molecular weight, as well as together with alkylated aromatic sulphonic acids and the like. They may also be used in admixture with inorganic salts, as for example Glauber's salt, sodium carbonate, orthophosphates, metaphosphates or pyrophosphates, or protective colloids, such as glue or gelatines, or with organic solvents, as for example cyclohexanol and cyclohexanone.

The following example will further illustrate how the said invention may be carried out in practice but the invention is not restricted to this example. The parts are by weight.

*Example*

200 parts of the ether containing chlorine which is obtained by adding on 1 molecular proportion of epichlorhydrin to an industrial mixture of dihydro- and tetrahydro-abietinol, for example at about 170° C. under pressure are dissolved in 400 parts of ethyl alcohol and heated for about 4 hours at 80° C. with 170 parts of a 20 percent alcoholic solution of trimethylamine in a stirring autoclave. After distilling off the excess of trimethylamine and the alcohol, a solid resinous product is obtained which yields in water strongly foaming solutions and which is eminently suitable as a wetting and emulsifying agent as well as for the treatment of dyed and non-dyed textiles.

If the beta-chlorethyl ether of abietinol (obtainable for example from the beta-hydroxyethyl ether of abietinol prepared by the addition of 1 molecular proportion of ethyleneoxide to 1 molecular proportion of abietinol by the action of phosphorous oxychloride) be used instead of the said ether, a product having similar properties is obtained.

By employing pyridine instead of trimethylamine, a product having valuable properties is also obtained.

Aniline or methylaniline may also be used in the present case. The products obtainable therewith may be used as softening agents and the like. The products obtained by using glycocoll or sarcosine have soap-like properties in the form of their sodium salts. They may also be employed as fixatives for tanning agents and for rendering artificial silk fabrics slip-proof.

Hydrogenated abietic alcohol may also be used instead of the mixture of dihydro- and tetrahydroabietinol.

What we claim is:

1. The process for the production of high molecular nitrogenous condensation products, which comprises causing a compound of the general formula

R—CH₂—O—R₁—Z wherein R is an abietinyl radicle, R₁ stands for a radicle selected from the class consisting of alkylene and hydroxyalkylene radicles and Z is a halogen atom, to react with an organic nitrogen-containing basic reacting compound.

2. A process for the production of high molecular nitrogenous condensation products which comprises causing a sulphuric acid ester of abietinol to react with an aliphatic alcohol containing up to three carbon atoms and at least one terminal halogen atom, and then with a nitrogen-containing basic reacting compound.

3. A high molecular nitrogenous condensation product selected from the class consisting of compounds of the general formulae

R—CH₂—O—R₁—B and

R—CH₂—O—R₁—B₁—A wherein R is an abietinyl radicle, R₁ stands for a radicle selected from the class consisting of alkylene and hydroxyalkylene radicles, B for a radicle of a basic organic nitrogen compound from the class consisting of radicles of secondary aliphatic amines each carbon chain of which has up to 6 carbon atoms and radicles of secondary heterocyclic nitrogenous bases, B₁ for a radicle of a basic organic nitrogen compound selected from the class consisting of radicles of tertiary aliphatic amines each carbon chain of which has up to 6 carbon atoms and radicles of tertiary heterocyclic bases, and A is a member of the group consisting of hydroxyl and an anion, R₁ and A being bound to nitrogen contained in the said radicles B and B₁.

4. A high molecular nitrogenous condensation product of the general formula

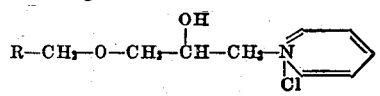

wherein R is a dihydroabietinyl radicle.

5. A high molecular nitrogenous condensation product of the general formula

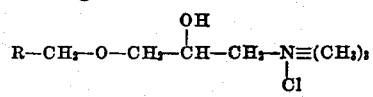

wherein R is an abietinyl radicle.

6. The process for the production of high-molecular nitrogenous condensation products, which comprises causing a compound of the general formula

R—CH₂—O—R₁—Z wherein R is an abietinyl radicle, R₁ stands for a radicle selected from the class consisting of alkylene and hydroxyalkylene radicles and Z is a halogen atom to react with an amine.

7. The process for the production of high-molecular nitrogenous condensation products, which comprises causing a compound of the general formula

R—CH₂—O—R₁—Z wherein R is an abietinyl radicle, R₁ stands for a radicle selected from the class consisting of alkylene and hydroxyalkylene radicles and Z is a halogen atom to react with a heterocyclic nitrogenous base.

8. The process for the production of high-molecular nitrogenous condensation products, which comprises causing a compound of the general formula

R—CH₂—O—R₁—Z wherein R is an abietinyl radicle, R₁ stands for a radicle selected from the class consisting of alkylene and hydroxyalkylene radicles and Z is a halogen atom to react with pyridine.

9. The products as defined in claim 3, wherein $R_1$ is ethylene.

10. A high molecular nitrogenous condensation product of the general formula

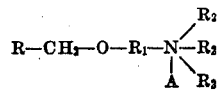

wherein R is an abietinyl radicle, $R_1$ stands for a radicle selected from the class consisting of alkylene and hydroxy alkylene radicles, $R_2$ is an aliphatic radicle having up to 6 carbon atoms and A is the anion of a mineral acid.

HANS KRZIKALLA.
PAUL GARBSCH.
WILHELM PANNWITZ.